United States Patent

[11] 3,578,980

[72] Inventors John A. Decker, Jr.
Concord, Mass.;
Martin O. Harwit, Ithaca, N.Y.
[21] Appl. No. 834,392
[22] Filed June 18, 1969
[45] Patented May 18, 1971
[73] Assignee Comstock & Wescott, Inc.
Cambridge, Mass.

[54] SPECTRAL ANALYSIS USING MASKS HAVING DIFFERENT COMBINATIONS OF TRANSMITTING AND NON-TRANSMITTING PORTIONS
14 Claims, 4 Drawing Figs.

[52] U.S. Cl. .................................................. 250/237,
250/219
[51] Int. Cl. .................................................. G06k 9/00
[50] Field of Search .................................................. 250/219,
237; 356/74, 79

[56] References Cited
UNITED STATES PATENTS
2,820,173 1/1958 Raake .......................... 250/237

3,246,557 4/1966 Mertz et al. .................. 250/237

Primary Examiner—James W. Lawrence
Assistant Examiner—Martin Abramson
Attorney—Roberts, Cushman & Grover ABSTRACT: A light spectrum is projected on a photocell through a movable mask having plural combinations of arrays of light windows and opaque areas which transmit to or mask different portions of the spectral line from the photocell. The combinations of windows and opaque areas in the several arrays are different and distributed according to a set of linearly independent equations forming a matrix. As the mask is advanced stepwise the photocell successively senses all the light transmitted from the spectrum through successively interposed arrays and generates a corresponding group of values with an inverse of the mask matrix so as to derive a series of values representing the distribution of energy along the spectrum. The mask thus analyzes and encodes the spectral energy distribution.

Patented May 18, 1971
3,578,980
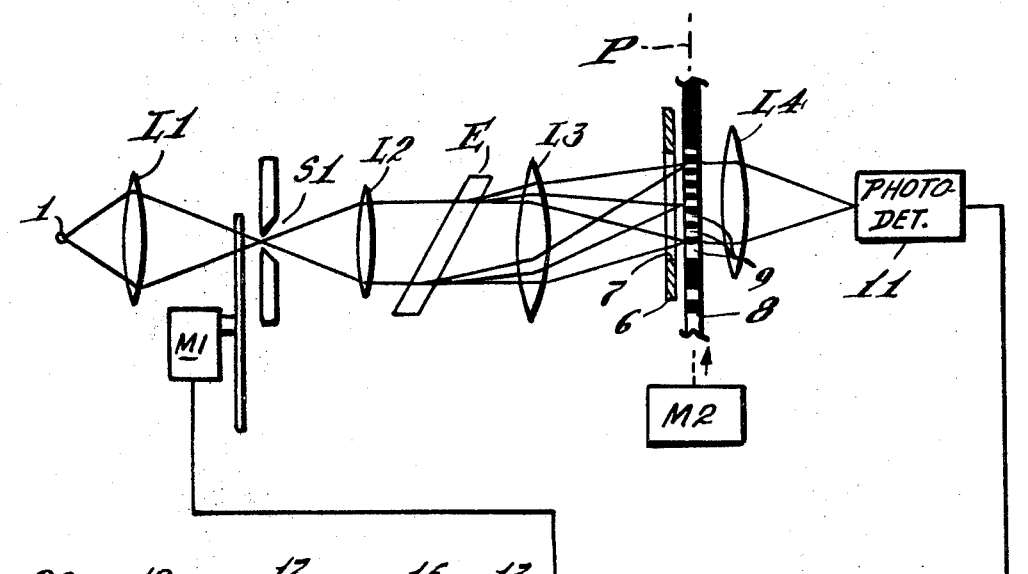
Fig. 1
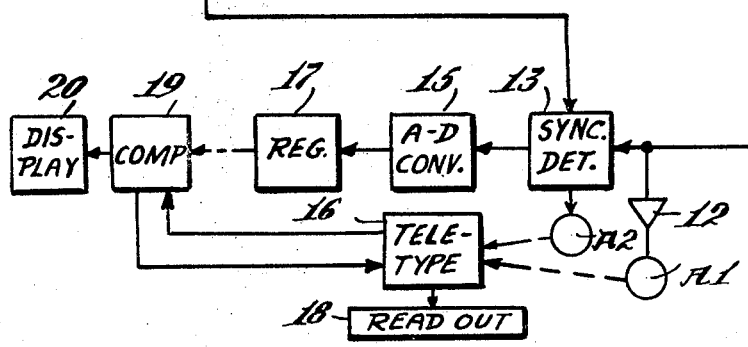
Fig. 2
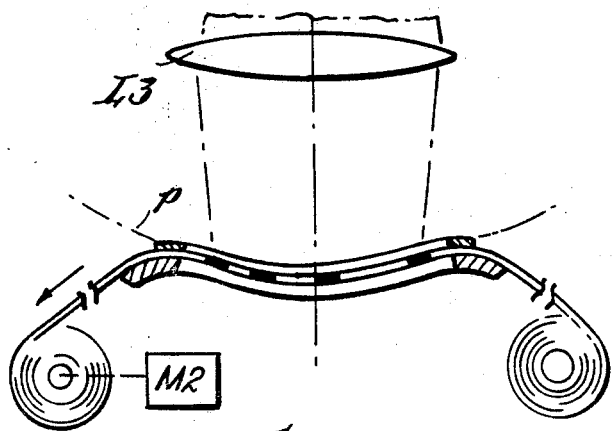
Fig. 3
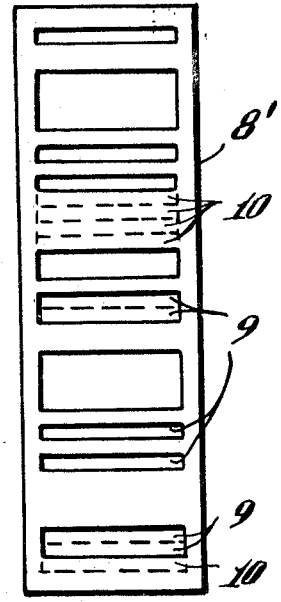
Fig. 4
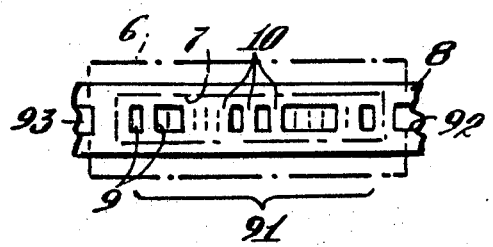
Inventors
John A. Decker, Jr.
Martin O. Harwit
by Roberts, Cushman & Grover
Attys

SPECTRAL ANALYSIS USING MASKS HAVING DIFFERENT COMBINATIONS OF TRANSMITTING AND NON-TRANSMITTING PORTIONS

BACKGROUND OF THE INVENTION

When a light image such as a light spectrum has been formed its significance lies in the various light intensities or energy levels at various positions along the line of the spectrum, and thus it is customary to measure the energy levels of the different portions of the line. These measurements may be made by viewing successive narrow wavelength bands of the spectrum one by one through a slit and recording the intensity of each band in sequence. Such a technique is suitable for meticulous analysis and direct strip chart recording of a spectrum from a long persisting controlled light source, but is poorly adapted for analysis of a natural light source and transmission of the analytic data under conditions such as are encountered in a space vehicle. It has been proposed to use a rotating disc with light chopping windows in rings with different spacings which chop light from different bands of the spectrum at different frequencies. The energy of different frequency modulated bands may then be simultaneously sensed by, and the many energy values transmitted from, a plurality of photocells and the original spectrum reconstructed by Fourier or Fresnel transformations. (See M. J. E. Golay, Journal of the Optical Society of America, Vol. 39, page 437 (1939) and Vol. 41, page 468, 1951; J. F. Grainger et al., Journal of Physics, Vol. 28, Supplement 3—4, pages C2—44 (1967); L. Mertz, Transformations in Optics, John Wiley & Sons, New York, 1965).

But when a large number of spectral bands are to be resolved a large number of closely spaced modulating frequencies are required and result in generation of unwanted harmonics which distort the reconstructed spectrum. Moreover, the calculations with transformations are extremely complex and time-consuming, the solution involving hours with a computer, and being beyond practical hand calculation.

Accordingly the main objects of the present invention are to provide a way of analyzing and encoding energy values along a line of light such as a spectrum which avoids harmonic distortion from light modulation at many frequencies, and which permits rapid or substantially instantaneous computation of the energy distribution along the line.

SUMMARY OF THE INVENTION

According to the invention optical apparatus for sequential encoding of the value of electromagnetic energy levels distributed along a line comprises means for imaging the line of energy levels, a photoelectric device for sensing the energy of the imaged line, optical means between the imaging means and device for selectively transmitting portions of the line to the device including a movable support having a group of arrays of energy transmitting and energy nontransmitting elements, each array having a different combination of at least two each of said transmitting and nontransmitting elements, and each array being movable with the support to a position coextensive with the line, and means for moving the support stepwise to bring the arrays sequentially to said position so that successive arrays transmit the energy from different combinations of portions of the whole line to the photoelectric device to cause the device to produce a group of electrical values each proportional to the total energy transmitted from each array, the group of values representing the energy distribution along the line.

THE DRAWING

FIG. 1 is a diagrammatic view of optical apparatus for analyzing a spectrum with an encoding mask;

FIG. 2 is an enlarged detail of a part of the apparatus of FIG. 1; and

FIGS. 3 and 4 are plan views of two forms of encoding mask.

DESCRIPTION OF THE PREFERRED EMBODIMENTS

Spectrum Analyzing Apparatus (FIG. 1)

In FIG. 1 spectral analyzing apparatus comprises a light source 1, local or distant, of which an image is focused by a field lens L1 upon an entrance slit S1. Light passing through the slit is collimated by a lens L2 and diffracted by a prism or grating E. The spectrally dispersed light from the prism or grating is focused by a lens L3 as a spectrum in an image plane P which, as well known in the art, may be curved. As an other example, the above spectrometric components may be comprised of a Jarrell-Ash type 82—110, 0.25 meter Ebert-Fastie monochromator with a 100 micron entrance slit, concave mirrors in lieu of lenses L2 and L3, and a grating of 295 grooves per millimeter blazed for 2.1 microns. An elongate strip mask 8, moved in the plane P by a motor M2, has a plurality of slit elements 9 through its generally opaque area, which slits are interposed between a plate 6 with an aperture 7 which frames the mask slits on which the spectrum is desired to be imaged. Narrow portions throughout the spectral line are selected by the movable mask for transmission through the slit elements to a lead-sulfide photocell 11 with a 1×3 mm. active area. The current output of the photocell 11 may be read by a microammeter A1, increased if desired by an amplifier 12. The current reading is proportional to the total energy from the combination of portions of the spectral line which has been selected by the mask 8. After each reading a new array or combination of slits are stepped to position behind the framing plate 6. As will be explained in detail, the mask contains substantially, or exactly, the same number of arrays, or combinations of slit elements as there are slit elements in each array. Thus, that number of energy readings are taken successively of different combinations of portions of the framed spectrum.

The sequence of spectral energy readings encoded by the mask 8 may be manually recorded from the meter A1 and hand calculations performed, as hereinafter described with respect to The Encoding Mask, but the encoding characteristic of the present mask is particularly well adapted to subsequent machine calculations. The readings from the meter A1 may also be visually read and hand transmitted by a conventional teletypewriter 16 to a computer 19 in which is stored a program like that described hereafter under The Encoding Mask. Or the readings may be electronically transmitted to the computer through a channel including a conventional synchronous detector 13, analog to digital converter 15 and digital register 17, which latter transmits the energy reading to the computer in digital form. In each case the computer operates on the transmitted readings to reconstruct the spectrum for readout as a series of energy values versus wavelength bands of the spectrum, or as a strip chart recording of an analog curve displaying energy amplitude versus wavelength. The computer may show the values on its own display 20 such as an alpha-numeric printer or strip chart recorder, or transmit the values to the teletype 16 for display on the teletype readout 18 or a graphic recorder.

THE ENCODING MASK

As shown enlarged in FIGS. 3 and 4 the mask 8 comprises an elongate strip of flexible opaque body material such as beryllium copper through which the slit elements 9 have been photographically etched. Shown in FIG. 3 are one full array 91 of windows 9 and the beginning 92 and end window 93 of two other arrays. On each strip 8 are a group of such arrays of windows with opaque areas 10 between. In FIG. 3, the dotted lines indicate that some of the windows or opaque areas are in effect two or more contiguous window elements or opaque areas. Thus, for mathematical purposes the array 91 comprises 10 window elements and 9 opaque elements, totaling 19 elements. Preferably the number of window and opaque elements in each array are approximately equal in number, and each strip contains substantially the same number of arrays as the total elements in each array.

The combination of transparent and opaque elements in each array is different from the combination in other arrays, and are preferably selected according to a set of simultaneous linear algebraic equations in the form:

$$a_{1,1} x_1 + a_{1,2} x_2 + \ldots + a_{1,j} x_j + \ldots + a_{1,m} x_m = I_1$$
$$a_{2,1} x_1 + a_{2,2} x_2 + \ldots + a_{2,j} x_j + \ldots + a_{2,m} x_m = I_2$$
$$\vdots$$
$$a_{i,1} x_1 + a_{i,2} x_2 + \ldots + a_{i,j} x_j + \ldots + a_{i,m} x_m = I_i \quad (1)$$
$$\vdots$$
$$a_{m,1} x_1 + a_{m,2} x_2 + \ldots + a_{m,j} x_j + \ldots + a_{m,m} x_m = I_m;$$

or equivalently, in matrix notation:

$$[a_{i,j}][x_j] = [I_i] \quad (2)$$

where $i$ and $j$ take all values from 1 to $m$, $I_i$ is the radiation intensity measured by the photodetector for the $i^{th}$ array, $x_j$ is the radiation intensity in the $j^{th}$ spectral portion (i.e., radiation passing through the $j^{th}$ array on the mask); the coefficient $a_{i,j}$ is either 1 or 0 depending on whether the $i^{th}$ element of array $j$ is a window or opaque. The elements of the coefficient matrix $[a_{i,j}]$ may easily be chosen such that the above matrix equation can be inverted, $$[x_j] = [i,j]^{-1}[I_i], \quad (3)$$

and solved for each $x_j$ value once the $I_i$ values are known; this merely requires that the determinant of $[a_{i,j}]$ not vanish. In other words, by a proper choice of transparent and opaque elements along the $m$ arrays of the encoding mask, it is possible to deduce the intensity of the radiation through each such element from sequential measurements of the radiation intensity reaching the photodetector as the mask is sequentially stepped through $m$ positions.

An example of a 19 element by 19 array mask is given in the table Matrix I, wherein 0 represents an opaque element and 1 represents a window element. The first horizontal row of the matrix is the array of elements in the masks in FIG. 3.

An example of the inverse of the above-described matrix is shown in the table Matrix II, wherein + represents the numbers +0.1 and − represents −0.1. These numbers are substituted for the expansion of the term $[a_{i,j}]^{-1}$ in the inverse matrix, equation 3 above. Thus when the intensity values measured by the photodetector 11 are substituted for the expansion of the term $I_i$, the intensities $x_j$ of the various portions or bands of the spectral line may be found.

MATRIX I

```
1 0 1 1 0 0 0 0 1 0 1 0 1 1 1 1 0 0 1
1 1 0 1 1 0 0 0 0 1 0 1 0 1 1 1 1 0 0
0 1 1 0 1 1 0 0 0 0 1 0 1 0 1 1 1 1 0
0 0 1 1 0 1 1 0 0 0 0 1 0 1 0 1 1 1 1
1 0 0 1 1 0 1 1 0 0 0 0 1 0 1 0 1 1 1
1 1 0 0 1 1 0 1 1 0 0 0 0 1 0 1 0 1 1
1 1 1 0 0 1 1 0 1 1 0 0 0 0 1 0 1 0 1
1 1 1 1 0 0 1 1 0 1 1 0 0 0 0 1 0 1 0
0 1 1 1 1 0 0 1 1 0 1 1 0 0 0 0 1 0 1
1 0 1 1 1 1 0 0 1 1 0 1 1 0 0 0 0 1 0
0 1 0 1 1 1 1 0 0 1 1 0 1 1 0 0 0 0 1
1 0 1 0 1 1 1 1 0 0 1 1 0 1 1 0 0 0 0
0 1 0 1 0 1 1 1 1 0 0 1 1 0 1 1 0 0 0
0 0 1 0 1 0 1 1 1 1 0 0 1 1 0 1 1 0 0
0 0 0 1 0 1 0 1 1 1 1 0 0 1 1 0 1 1 0
0 0 0 0 1 0 1 0 1 1 1 1 0 0 1 1 0 1 1
1 0 0 0 0 1 0 1 0 1 1 1 1 0 0 1 1 0 1
1 1 0 0 0 0 1 0 1 0 1 1 1 1 0 0 1 1 0
0 1 1 0 0 0 0 1 0 1 0 1 1 1 1 0 0 1 1
```

Instead of using a mask strip with 19 different arrays stepped array by array as in FIG. 3, a mask may be calculated in which a single series of transparent and opaque elements

MATRIX II

```
+ + − − + + + + − + − + − − − − + + −
− + + − − + + + + − + − + − − − − + +
+ − + + − − + + + + − + − + − − − − +
+ + − + + − − + + + + − + − + − − − −
− + + − + + − − + + + + − + − + − − −
− − + + − + + − − + + + + − + − + − −
− − − + + − + + − − + + + + − + − + −
− − − − + + − + + − − + + + + − + − +
+ − − − − + + − + + − − + + + + − + −
− + − − − − + + − + + − − + + + + − +
+ − + − − − − + + − + + − − + + + + −
− + − + − − − − + + − + + − − + + + +
+ − + − + − − − − + + − + + − − + + +
+ + − + − + − − − − + + − + + − − + +
+ + + − + − + − − − − + + − + + − − +
+ + + + − + − + − − − − + + − + + − −
− + + + + − + − + − − − − + + − + + −
− − + + + + − + − + − − − − + + − + +
+ − − + + + + − + − + − − − − + + − +
``` actually comprises 19 different but overlapping arrays. Such a series has $n+(n-1)\ l$ elements wherein the letter $n$ is the number of elements in each array and the letter $l$ is the number of elements stepped in each array change, $n-l$ being the number of overlapping elements common to successive arrays. For example, a single series of elements equivalent to the 19 element by 19 array of Matrix I is:

0110000101011110011011000010101111001 (4)

In this series of opaque elements (0) and transparent elements (1), the last 19 elements are identical with the top horizontal row of Matrix I, the first 19 elements above are identical with the bottom row of Matrix I, and each intermediate series of 19 elements is identical with an intermediate row of Matrix I. The corresponding 37 element mask 8' of FIG. 4 may be stepped one element at a time to bring 19 different 19 element arrays successively into the aperture 7 of the plate 6. Each of the 19 arrays will overlap the subsequent array by 18 elements.

If, in the masks of FIGS. 3 and 4 each element has a width of 0.1 mm., each 19 element array will be 1.9 mm., adequate to analyze and encode a 250 angstrom unit band of the spectrum. In analysis of wider spectral bands 100 or more slits are used. The mask may be stepped at the rate of 1 array per second or faster. Thus a fraction of a minute or a minute or two are consumed in taking the measurements. But, whereas the prior instruments required several hours to reconstruct the measurements into useable information, the present apparatus and method requires a minute or two. Furthermore, the individual measurements through each array may be transmitted for computation after each measurement so that the reconstruction is completed after the last measurement so quickly as to be substantially instantaneous with the last measurement.

Thus, by selecting the distribution of elements in the mask according to a set of linearly independent algebraic equations such that the arrays have different combinations of elements, not only is encoding rapid, but the time and complexity of reconstructing the measured values is very greatly reduced. And since the mask is stationary during measurements, spurious harmonic signals are not introduced.

We claim:

1. Optical apparatus for sequential encoding of the value of electromagnetic energy levels distributed along a line
    means for imaging the line of energy levels,
    a photoelectric device for sensing the energy of the imaged line,
    optical means between the imaging means and device for selectively transmitting portions of the line to the device including a movable support having a group of arrays of energy transmitting and energy nontransmitting elements, each array having a different combination of at least two each of said transmitting and nontransmitting elements, and each array being movable with the support to a position coextensive with the line, and
    means for moving the support stepwise to bring the arrays sequentially to said position so that successive arrays transmit the energy from different combinations of portions of the whole line to the photoelectric device to cause the device to produce a group of electrical values each proportional to the total energy transmitted from each array, the group of values representing the energy distribution along the line.

2. Apparatus according to claim 1 wherein there are the substantially same number of arrays as there are elements in each array.

3. Apparatus according to claim 1 wherein the distribution of elements in each array is linearly independent of the distribution in other arrays.

4. Apparatus according to claim 3 wherein said distribution defines a matrix, and the aforesaid electrical values when multiplied by the inverse of the matrix directly yield the energy distribution of the line.

5. Apparatus according to claim 3 wherein the number of energy transmitting and energy nontransmitting elements in the group of arrays are substantially equal.

6. Apparatus according to claim 1 wherein the elements have substantially the same area.

7. Apparatus according to claim 1 wherein said support is curved to conform to the image plane of the line.

8. Apparatus according to claim 1 wherein said support is an elongate strip with the elements extending in a series lengthwise of the strip.

9. Apparatus according to claim 8 wherein said series of elements forms a sequence of overlapping arrays.

10. Apparatus according to claim 9 wherein said series is a series of $n+(n-1) l$ elements, wherein $n$ is the number of elements in each array, and $n-l$ is the number of overlapping elements common to successive arrays.

11. Optical apparatus for analysis and transmission of light energy distributed along a line comprising means for imaging the light line in a plane, a photoelectric device disposed to receive and sense light from the line, optical means between the imaging means and photoelectric device including an elongate strip with light transmitting and light nontransmitting elements substantially equal in number and area extending in a series lengthwise of the strip, said elements being distributed in a plurality of arrays substantially equal in number to the number of elements in each array, the elements in each array including at least two each of said transmitting and nontransmitting elements and being distributed in different combinations represented by a set of linearly independent equations defining a matrix, means for moving the strip stepwise to bring the arrays sequentially to a position coextensive with the light line so that successive arrays transmit the energy from different combinations of portions of the whole line to the photoelectric device to cause the device to produce a group of electrical values each proportional to the total energy transmitted from each array, the group of values representing the energy distribution along the line, means to register said group of values, and computer means for operating on said group of values with the inverse of the aforedefined matrix, thereby to derive a series of values displaying the distribution of light energy along said line.

12. Apparatus according to claim 11 wherein said imaging means comprises spectral dispersion optics for spreading light from a source along the line.

13. The method of recording the value of electromagnetic energy levels distributed along a line which comprises successively transmitting different combinations of portions of the line, the combination of portions transmitted being changed at each transmission and corresponding to a set of linearly independent equations, and sensing the values of energy transmitted from the line at successive transmissions to generate a group of values, each value being proportional to the total energy of each transmission.

14. The method of claim 13 characterized by operating on said group of values with the inverse of a matrix representing said set of equations, thereby to derive a series of values representing the distribution of energy along said line.